United States Patent
Buckner, Jr. et al.

(10) Patent No.: US 7,199,311 B1
(45) Date of Patent: Apr. 3, 2007

(54) EMERGENCY MEDICAL SERVICE (EMS) STRETCHER DIGITAL SCALE

(75) Inventors: Ellis Buckner, Jr., Vero Beach, FL (US); Rodney K. Johnston, Vero Beach, FL (US)

(73) Assignee: Pro Scale Plus, LLC, Vero Beach, FL (US)

( * ) Notice: Subject to any disclaimer, the term of this patent is extended or adjusted under 35 U.S.C. 154(b) by 0 days.

(21) Appl. No.: 11/370,782

(22) Filed: Mar. 8, 2006

(51) Int. Cl.
*G01G 19/52* (2006.01)
*G01G 21/22* (2006.01)

(52) U.S. Cl. .................. 177/144; 177/245; 177/262; 5/627

(58) Field of Classification Search .............. 5/627; 177/144, 245, 262
See application file for complete search history.

(56) References Cited

U.S. PATENT DOCUMENTS

| | | | | |
|---|---|---|---|---|
| 1,072,052 A * | 9/1913 | Stoehr | .......................... | 5/626 |
| 1,136,274 A * | 4/1915 | Seniuk | ........................ | 52/103 |
| 1,275,911 A * | 8/1918 | Hansen | ....................... | 177/262 |
| 2,210,399 A * | 8/1940 | Olaf | ........................... | 177/126 |
| 2,818,477 A | 12/1957 | Gollhofer | ..................... | 200/85 |
| 2,931,640 A * | 4/1960 | Riddle, Jr. | ................... | 177/262 |
| 3,151,343 A * | 10/1964 | McCormick | ................... | 5/627 |
| 5,065,830 A * | 11/1991 | Stevenson | ................... | 177/263 |
| 5,319,817 A | 6/1994 | Hay et al. | ....................... | 5/611 |
| 5,393,938 A | 2/1995 | Bumbalough | ............... | 177/144 |
| 5,481,770 A | 1/1996 | Ahlsten | ......................... | 5/625 |
| 5,780,781 A * | 7/1998 | Berger et al. | ................ | 177/126 |
| 5,813,629 A * | 9/1998 | Cabrera | .................... | 244/118.6 |
| 6,054,658 A | 4/2000 | Duhon et al. | ................. | 200/86 |
| 6,093,895 A | 7/2000 | Niosi | ......................... | 177/136 |
| 6,256,896 B1 * | 7/2001 | Landauer | ..................... | 33/512 |
| 6,357,063 B1 | 3/2002 | Selby | .......................... | 5/81.1 |
| 6,505,522 B1 | 1/2003 | Wilssens | ................. | 73/862.51 |
| 6,680,442 B1 | 1/2004 | Rynd et al. | ................. | 177/140 |
| 6,898,811 B2 | 5/2005 | Zucker et al. | ................. | 5/626 |
| 6,998,543 B2 * | 2/2006 | Sugrue et al. | ............. | 177/126 |
| 2002/0005300 A1 | 1/2002 | Saleem | ....................... | 177/144 |
| 2005/0090721 A1 | 4/2005 | Pirzada | ....................... | 600/300 |

* cited by examiner

*Primary Examiner*—Randy W. Gibson
(74) *Attorney, Agent, or Firm*—Brian S. Steinberger; Law Offices of Brian S. Steinberger, P.A.

(57) ABSTRACT

Portable scale devices, apparatus and methods for use with stretchers so that emergency medical service (EMS) personal can accurately measure a patient's weight in the field so that proper medication treatment and dosage can be administered. A head plate member can be pivotably attached to a middle plate, and a foot plate member can also be pivotably attached to the middle plate. The head and foot plate members can be inclined to form a V configuration relative the middle plate. A scale can be attached beneath the middle plate so that the pivotable head and foot plate members on the middle member with the scale can be easily inserted between a mattress and a stretcher. The portable scale devices, apparatus and methods can be used in the field as soon as a patient is placed on the stretcher, as well as when the stretcher is being physically moved and handled in the field, and additionally when the stretcher is being placed and/or moved by a vehicle such as an ambulance.

14 Claims, 4 Drawing Sheets

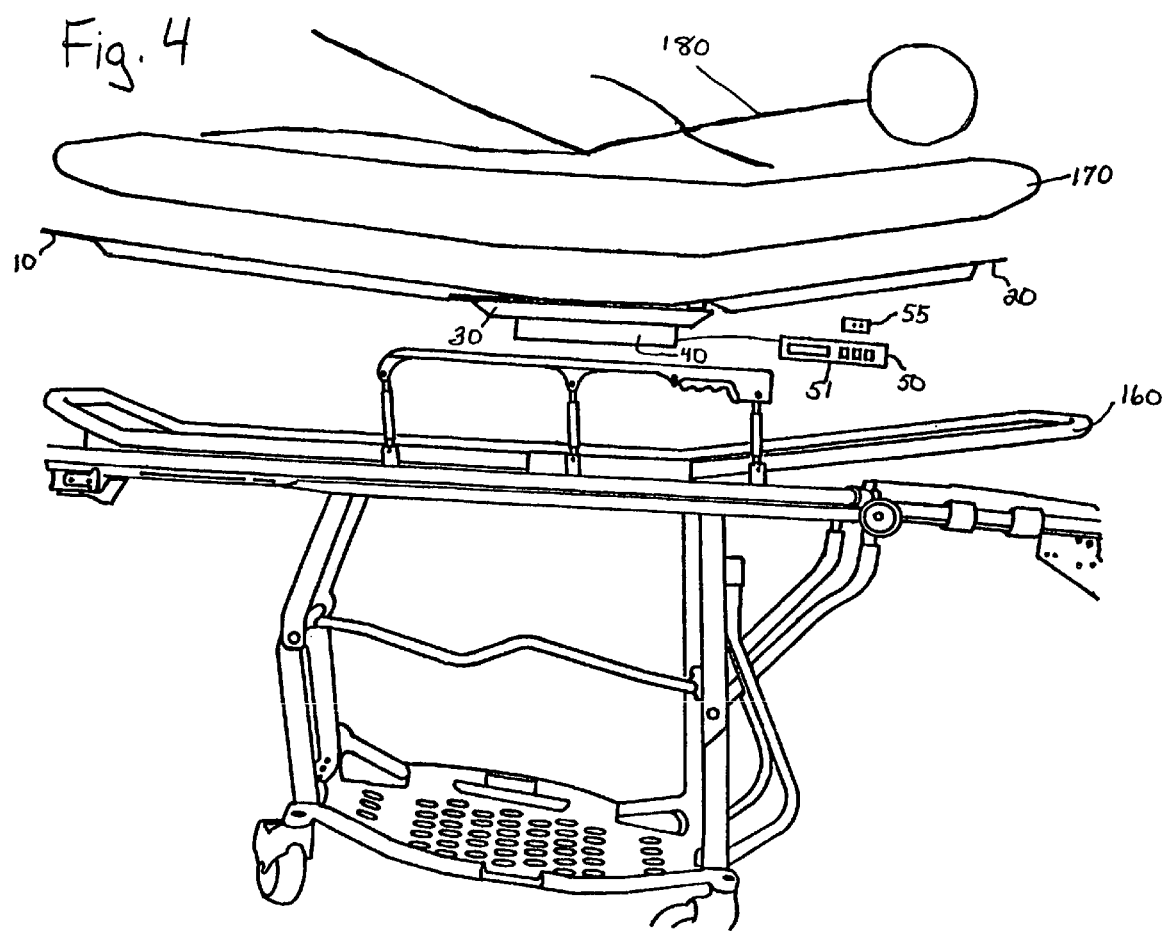

EMERGENCY MEDICAL SERVICE (EMS) STRETCHER DIGITAL SCALE

This invention relates to scales and determining weight, and in particular to devices, apparatus, and methods for determining weights of patients on stretchers used in the field and/or while the stretchers are being moved and transported by vehicles.

BACKGROUND AND PRIOR ART

Determining accurate patient weight is extremely important to medical staff that need to administer proper medication and dosage amounts to patients being treated. During a medical emergency such as treating a victim at an accident scene and/or rushing a patient to the hospital, emergency medical service (EMS) personal have little time to estimate a patients weight since medical treatment must be quickly done to reduce pain and discomfort to the patient, reduce further body damage and even prevent death.

Under emergency conditions, the EMS personal often have to rely on rough estimates based on guessing the patients body weight that is often inaccurate. Size, gender, age, and clothing on the patient can further distort the EMS personal from determining an accurate weight estimate.

Underdosage and overdosage of medications can and has resulted from such guess work. Therefore, the proper dosage of medication can be necessary between life and death for the patient.

Scales used at hospitals can provide accurate estimates of a patient's weight. However, such scales cannot be used with foldable stretchers that are used by EMS personal. Additionally, EMS vehicles have limited space and are not suitable for housing existing hospital scales.

Attempts have been made over the years to weigh patients but fail to overcome all the problems above. For example, U.S. Pat. No. 6,093,895 to Niosi describes a "Patient Weighing Apparatus for Emergency Service Vehicles", title. However, this patent requires the stretcher wheels engage pads mounted to the floor of a EMS vehicle, which means this device would fail if the stretcher does not properly engage these pads. Additionally, this device does not work when patients must be treated on the stretcher before being transported by the vehicle.

U.S. Patent Publication 2002/0005300 to Saleem describes a "Patient Transporting Apparatus", title that includes "an upper board . . . supported on eight evenly distributed load cell or strain monitoring devices . . . mounted on a lower board 14 . . . ", page 2, paragraph 35. However, this apparatus requires "liquid"/"fluid" within the "cells"/"devices" where pressure readings are taken through "connecting tube(s)" from each of the "liquid"/"fluid" filled "cells"/"devices", paragraph 36. In emergency operations, the "liquid"/"fluid" filled containers can become damaged by being punctured and/or effected by hot and cold environmental conditions. Clearly, if one of the "liquid"/"fluid" filled "cells"/"devices" fails, the entire weighing accuracy would be off. Thus, this apparatus would not be practical for at least these reasons for EMS operations.

U.S. Pat. No. 6,898,811 to Zucker et al. describes a "Device for Emergency Transport Of Pediatric Patients', title. While children are important patients, the Zucker '811 device is admittedly not suitable or practical for adult sized patients. This device also requires the use of various belts and clamps that would further add delay time to installation and use of the device. Such delay would potentially hamper the life saving and injury reducing results that are necessitated by EMS treated patients.

Thus, the need exists for solutions to the above problems with the prior art.

SUMMARY OF THE INVENTION

A primary objective of the present invention is to provide devices, apparatus and methods of providing a digital scale that can be easily used with all types of stretchers in the field.

A secondary objective of the present invention is to provide devices, apparatus and methods of providing a scale for a stretcher that can be used by emergency medical service personal as soon as a patient is placed on the stretcher in a field environment outside of an emergency service vehicle, such as an ambulance, and the like.

A third objective of the present invention is to provide devices, apparatus and methods of providing a scale for a stretcher that can be used by emergency medical service personal while the patient is being physically moved and handled on the stretcher to an emergency service vehicle, such as an ambulance, and the like.

A fourth objective of the present invention is to provide devices, apparatus and methods of providing a scale for a stretcher that can be used by emergency medical service personal while the patient loaded stretcher is located on and/or is being transported by a vehicle such as an ambulance, and the like.

A fifth objective of the present invention is to provide devices, apparatus and methods of providing a scale for a stretcher that can be used by emergency medical service personal where all components can fit under the mattress on the stretcher.

A sixth objective of the present invention is to provide devices, apparatus and methods of providing a lightweight and easily useable patient scale for a stretcher that can be used by emergency medical service personal that is also durable and not prone to failure in the field.

A preferred embodiment the portable scale device for use with stretchers in the field can include a scale, a head plate pivotably attached to the scale, a foot plate pivotably attached to the scale, wherein the scale with pivotably attached head and foot plates is separately positioned between a mattress and a stretcher so that a patient's weight is measurable.

A first pair of hinges can be used for pivotably attaching the head plate to the scale, and a second pair of hinges can be used for pivotably attaching the foot plate to the scale.

A first member such as a tube can be used for inclining the head plate relative to the scale, and a second member such as another tube can be used for inclining the foot plate to be relative to the scale, the first member and the second member allowing the head member, the foot member to be in a V configuration with the scale.

A middle plate can be attached to a top portion of the scale, the middle plate can have a first end edge and second end edge opposite to the first end edge, a first side edge and a second side edge opposite to the first side edge, wherein the head plate and the foot plate are pivotably attached to the middle plate.

A novel method of weighing patients on stretchers in the field, can include the steps of providing a scale with a pivotable head member and pivotable foot member, separately positioning the scale with pivotable head and foot members between a mattress and a stretcher, placing a patient on the stretcher, weighing the patient with the scale. Weighing of the patient can occur as soon as the patient is placed on the scale, as well as when the stretcher is being physically moved by EMS personal, as well as when the stretcher is being moved by a vehicle, such as an ambulance, and the like.

Additional method steps can include inclining the head member relative to the scale, and inclining the foot member to be relative to the scale, wherein the inclined head and foot members form a V configuration with the scale so that the patient can be weighed in an inclined position.

Further objects and advantages of this invention will be apparent from the following detailed description of the presently preferred embodiments which are illustrated schematically in the accompanying drawings.

BRIEF DESCRIPTION OF THE FIGURES

FIG. 4 is a side view of the scale of the preceding figures being used with a stretcher and patient.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of components will now be described.

| | |
|---|---|
| 1 | Stretcher Scale Embodiment |
| 10 | Foot plate |
| 12 | foot support tubing |
| 15 | foot plate hinges |
| 16 | raised incline member for foot |
| 20 | Head plate |
| 22 | head support tubing |
| 25 | head plate hinges |
| 26 | raised incline member for head |
| 30 | Middle base plate |
| 40 | Scale |
| 50 | LCD |
| 51 | Connector to LCD |
| 100 | Application Embodiment |
| 160 | Stretcher |
| 170 | Mattress |
| 180 | Patient |

Figure 1:
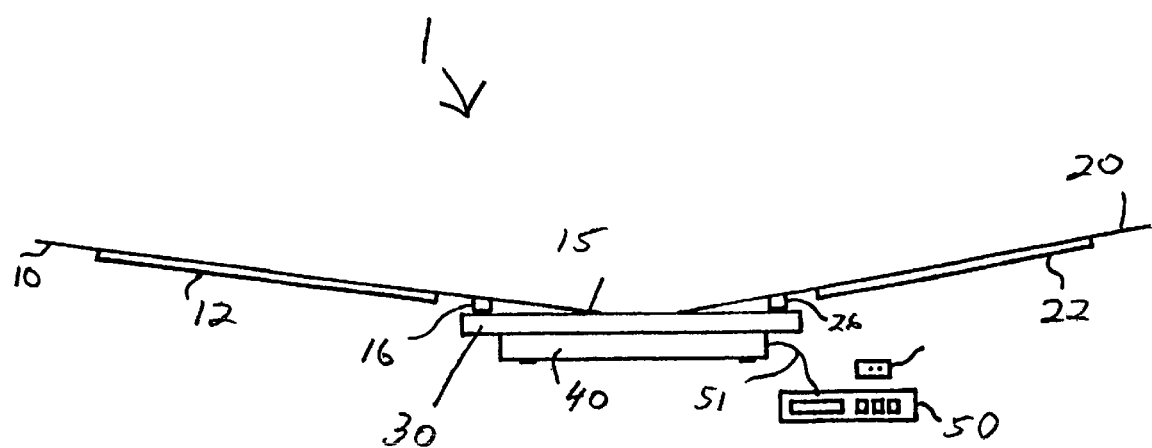
FIG. 1 is a side view of a preferred embodiment of the portable stretcher scale.
Figure 2:
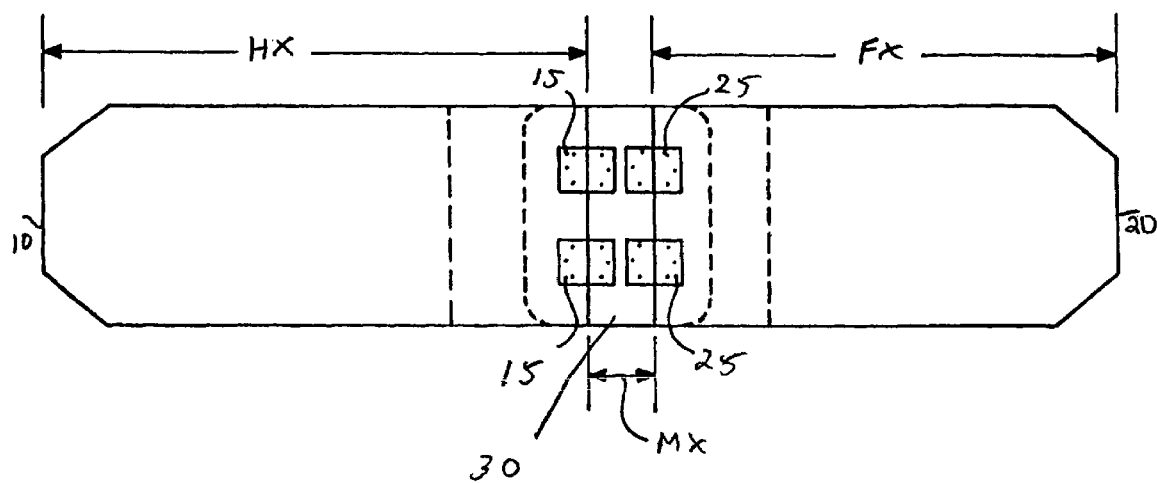
FIG. 2 is a top view of the portable stretcher scale of FIG. 1.
Figure 3:
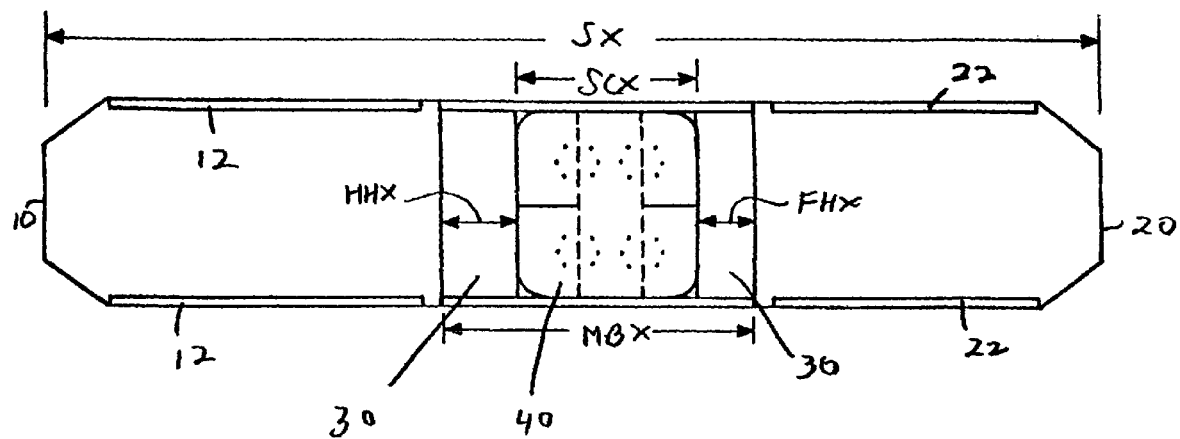
FIG. 3 is a bottom view of the portable stretcher scale of FIG. 1.

FIG. 1 is a side view of a preferred embodiment of the portable EMS stretcher scale 1. FIG. 2 is a top view of the portable stretcher scale 1 of FIG. 1. FIG. 3 is a bottom view of the portable stretcher scale 1 of FIG. 1. Referring to FIGS. 1–3, the EMS stretcher scale can include a head plate 20, foot plate 10, and middle base plate 30 which functions as a pressure plate.

The head plate 20 can have dimensions of approximately 23¾" L by approximately 15" W. The outer end can have corners each cut at an approximately 45 degree angle.

The foot plate 10 can have dimensions of approximately 34" L by approximately 15" W, and also include outer end corners cut at an approximately 45 degree angle.

The middle base plate 30 can function as a pressure plate and can attach to or be affixed an upper surface of a scale 40. A preferred embodiment for a scale can be a digital scale such as but not limited to the Silitec PS500L or Silitec WS 100L digital scales which can provide instantaneous weights up to 500 pounds with a 0.5 pound accuracy.

Attached underneath outer edges of both the head plate 10 and foot plate 20 can be support members 12, 22, which can be approximately 1" tubing that is can be used for supporting the head and foot plates 20, 10.

The head plate 20 and the foot plate 10 can be attached to the middle base plate 30 by approximately four (4) approximately 3" hinges 25, 15 which allow the head plate 20 and foot plate 10 to pivot up and down relative to the middle base plate 30 at slight inclines of approximately 2 to approximately 14 degrees. The incline then allows the weight of patients positioned on the stretcher to be supported by the middle base plate 30 which functions as a pressure plate. Raised incline members 16, 26 such as approximately one half inch (½") tubing, can be attached to the base ends of the head and foot plates 20, 10 to distribute the weight of the patient evenly over the Pressure plate. The components of the EMS Stretcher Digital Scale 1 such as the head, foot and middle base plates 10, 20, 30, and other components can be made from metal, such as but not limited to thin gage lightweight aluminum.

The novel stretcher scale 1 can have an overall length SX of approximately 67.5", the middle base plate (pressure plate) can have a length MBX of approximately 17", and the scale 40 can have a length SCX of approximately 12", with a distance FHX of approximately 2" distance from the hinge head to the scale plate, and a distance HHX of approximately 2.5" distance from hinge foot to scale plate. The overall length of the foot plate 10 can have a length HX of approximately 34", the overall length of the head plate 20 can have a length FX of approximately 22.75", with the distance between the head plate 20 and the foot plate 10 being approximately 9.75" (MX).

FIG. 4 is a side view of the scale of the preceding figures being used with a stretcher 160 and patient 180, where the EMS stretcher scale 1 can be positioned to be sandwiched between the mattress 170 and stretcher 160.

In operation, these components can work together when the patient 180 lies on top of the digital electronic weighing scale 1. When laid in a flat position, the patient's weight can be determined. When the patient needs to be in a sitting position or the leg of the of the patient needs to be elevated, this can still be allowed due to the Head and Leg having 3" hinges attached to the digital electronic weighing scale 1. The scale 1 only weighs in the lying flat position. These components all fit underneath the mattress of the EMS stretcher. The stretcher scale is designed to attach to all existing EMS Ambulance stretchers.

The invention works to provide the exact weight in pounds and kilograms of patients treated in the field so that the correct amount of a drug can be given to the patients while being treated and transported to the hospital. Some drugs require the patient's weight before the correct amount of a drug can be given. EMS has done this in the past by estimating the patient's weight or asking them if possible at times, but now the patient's weight can be obtained from this scale that lies on the stretcher underneath the mattress on which the patient lies.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable stretcher scale device comprising in combination:
   a single scale having a single upper solid planar surface;
   a solid metal head plate having a left end and a right end, the right end being pivotably attached to one portion of the single upper solid planar surface of the single scale by a head hinge member;
   a head incline member for inclining the head plate relative to the upper solid planar surface of the scale so that the left end of the head plate is raised above the right end of the head plate;
   a solid metal foot plate having a left end and a right end, the left end being pivotably attached to another portion on the single upper solid planar surface of the single scale by a foot hinge member;
   a foot incline member for inclining the foot plate relative to the single upper solid planar surface of the scale so that the right end of the foot plate is raised above the left end of the foot plate;
   a collapsible stretcher having an upper surface, the stretcher being having an assembled position with the upper surface substantially raised above a ground surface and a collapsed position; and
   a single mattress, wherein the single scale with pivotably attached head and foot plates is positioned to be sandwiched between the mattress and the collapsible stretcher when the collapsible stretcher is in the assembled position, so that a patient's weight is measurable by the single scale.

2. The portable scale device of claim 1, wherein the head hinge member and the foot hinge member each includes: two hinges for respectively pivotably attaching the head and the foot plates to the scale.

3. The portable device of claim 1, further comprising:
   a solid middle metal plate on the single upper solid planar surface of the single scale, the middle plate having a first end edge and second end edge opposite to the first end edge, a first side edge and a second side edge opposite to the first side edge, wherein the head plate and the foot plate are pivotably attached to the middle plate.

4. A method of weighing patients on collapsible stretchers in the field, comprising the steps of:
   providing a single scale with single upper solid planar surface, and with a single pivotable metal head plate member that is pivotally attached to a portion of the single upper solid planar surface of the scale, and a single pivotable metal foot plate member that is pivotally attached to another portion of the single upper solid planar surface of the scale;
   providing a collapsible stretcher that has an assembled position with an upper surface raised in an horizontal orientation above a ground surface, and a collapsed position with the upper surface not in a horizontal orientation;
   providing a single mattress;
   sandwiching the single scale with pivotable metal head and foot plate members between the single mattress and the upper surface of the collapsible stretcher with the stretcher in the assembled position;
   inclining both the single pivotable metal head plate member and the single pivotable metal foot plate member to the scale to form a V configuration with the upper surface of the scale
   placing a patient on the stretcher in the assembled position; and
   weighing the patient on the inclined metal head plate member and the inclined metal foot plate member with the single scale.

5. The portable scale device of claim 1, wherein the head incline member and the foot incline member each includes an elongated metal tube positioned underneath and across the right end of the solid metal head plate, and the foot incline member includes another elongated metal tube positioned underneath and across the left end of the solid metal foot plate.

6. The portable device of claim 5, wherein the metal elongated tubing and the another elongated metal tube member each include approximately ½ inch tubing.

7. The portable device of claim 5, further comprising:
   head side support members between the left end and the right end of the solid metal head plate and along each side of the solid metal head plate for supporting the solid metal head plate in a planar position;
   foot side support members between the left end and the right end of the solid metal foot plate and along each side of the solid metal foot plate for supporting the solid metal foot plate in a planar position.

8. The portable device of claim 7, wherein the head side support members and the foot side support members each include elongated metal tubes for supporting the solid metal head plate and the solid metal foot plate.

9. The portable device of claim 8, wherein the elongated metal support tubes are each approximately 1 inch tubing in diameter.

10. The portable device of claim 1, wherein the head plate, scale and foot plate have an overall length of approximately 67.5 inches.

11. The portable device of claim 1, wherein the head plate has a length of approximately 22.75 inches, and the foot plate has a length of approximately 34 inches, the middle plate has a length of approximately 17 inches, with the distance between the head plate and the foot plate being approximately 9.75 inches.

12. A portable scale device for use with stretchers comprising in combination:
   a single scale having a single upper surface;
   a solid metal single middle plate being attached to the upper surface of the single scale, the middle plate having a single solid upper planar surface;
   a solid metal single head plate having a left end and a right end, the right end being pivotably attached to one portion of the single upper surface of the single middle plate by a head hinge member;
   a head incline metal tube member for inclining the head plate relative to the middle plate so that the left end of the head plate is raised above the right end of the head plate, the tube member running underneath the right end of the head plate;
   head side metal support members between the left end and the right end of the solid metal head plate and along each side of the solid metal head plate for supporting the solid metal head plate in a planar position;
   a solid metal foot plate having a left end and a right end, the left end being pivotably attached to another portion on the single upper surface of the single middle plate by a foot hinge member;

a foot incline metal tube member for inclining the foot plate relative to the middle plate so that the right end of the foot plate is raised above the left end of the foot plate, the foot incline tube member running underneath the left end of the foot plate;

foot side metal support members between the left end and the right end of the solid metal foot plate and along each side of the solid metal foot plate for supporting the solid metal foot plate in a planar position, wherein the single scale with pivotably attached head and foot plates is positioned to be sandwiched between a mattress and a collapsible stretcher when the collapsible stretcher is in an assembled position, so that a patient's weight is measurable by the single scale.

13. The portable device of claim 12, wherein the head plate, scale and foot plate have an overall length of approximately 67.5 inches.

14. The portable device of claim 12, wherein the head plate has a length of approximately 22.75 inches, and the foot plate has a length of approximately 34 inches, the middle plate has a length of approximately 17 inches, with the distance between the head plate and the foot plate being approximately 9.75 inches.

* * * * *